United States Patent [19]

Campani

[11] Patent Number: 4,915,304
[45] Date of Patent: Apr. 10, 1990

[54] GUN, PARTICULARLY FOR CROP-SPRAYING

[75] Inventor: Ferdinando Campani, Modena, Italy
[73] Assignee: ARAG S.p.A., Emilia, Italy
[21] Appl. No.: 265,222
[22] Filed: Nov. 1, 1988

[30] Foreign Application Priority Data

Nov. 9, 1987 [IT] Italy ................ 40143 A/87

[51] Int. Cl.⁴ .............................................. B05B 1/34
[52] U.S. Cl. ................................ 239/473; 239/428.5; 239/478; 239/526; 239/574; 239/581.1
[58] Field of Search ............ 239/402.5, 403, 417.3, 239/419.5, 421, 424.5, 427, 428.5, 472, 473, 478, 479, 526, 527, 528, 530, 574, 581.1

[56] References Cited

U.S. PATENT DOCUMENTS

| | | | |
|---|---|---|---|
| 237,684 | 2/1881 | Hosford | 239/478 |
| 963,136 | 7/1910 | Gibbs | 239/478 |
| 2,035,194 | 3/1936 | Schellin | 239/472 |
| 2,999,647 | 9/1961 | Sosnick | 239/472 |
| 3,282,511 | 11/1966 | Barton | 239/473 |
| 4,083,497 | 4/1978 | Rosenberger | 239/526 |
| 4,166,579 | 9/1979 | Beise et al. | 239/526 |
| 4,527,743 | 7/1985 | Ettlinger et al. | 239/530 |

FOREIGN PATENT DOCUMENTS 285736 2/1928 United Kingdom ............ 239/478

Primary Examiner—Andres Kashnikow
Assistant Examiner—Michael J. Forman
Attorney, Agent, or Firm—Lowe, Price, LeBlanc, Becker & Shur

[57] ABSTRACT

The gun has a hollow grip (1) which incorporates an inlet duct (31), a substantially vertical on-off ball valve (26) occupying a central housing (C) and operated by a lever (3) recessed into the grip, and downstream of the on-off valve, a rotary valve (D) the central section (42) of which affords two sets of crossed holes (62, 63) offset from one another through 45° and with their axes set in parallel longitudinal and vertical planes that also contain the axes of inlet and outlet galleries (37, 37', 38, 38') connecting the interior of the grip with respective spray and long-jet ducts (39, 41); the rotary valve turns as one with a ratchet mechanism (58, 51, 59) operated by a longitudinally disposed lever (4) that can be worked with the forefinger, independently of the on-off lever (3), which is squeezed by the remaining three fingers.

3 Claims, 5 Drawing Sheets

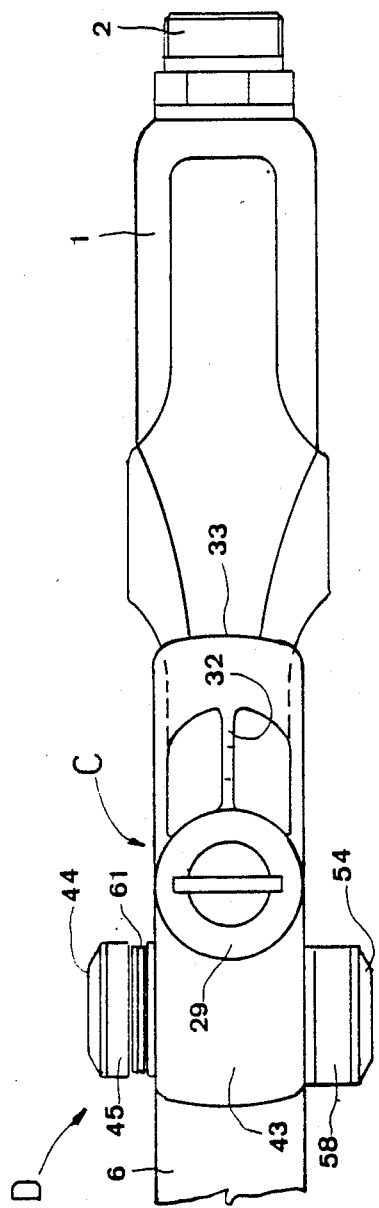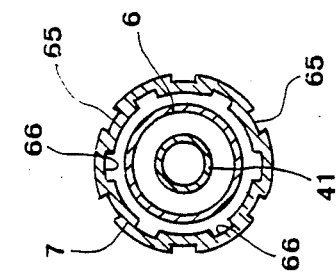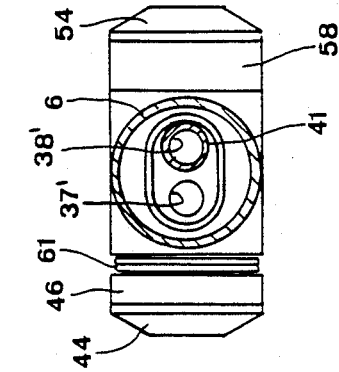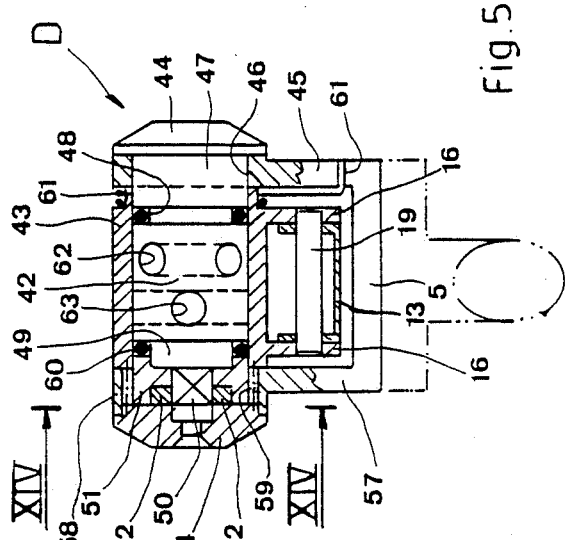

GUN, PARTICULARLY FOR CROP-SPRAYING

BACKGROUND OF THE INVENTION

The invention relates to a hand gun designed in particular for crop spraying, that is, a hand-held device used in spraying or dusting crops, say with leaf fungicides or fertilizers, or at all events in spreading or projecting a given liquid for whatever purpose, including washing and hosing, at pressures of 10 to 50 bar and more.

The prior art embraces a conventional lance-type implement that is operated with two hands, one hand closing around the grip, the fingers of which work the on-off valve, and the other operating the lever of a jet control valve that is situated beneath the barrel and designed to swing through a longitudinal vertical plane.

Another prior art gun, operated with one hand only, is designed such that the index and other fingers close on the lever of the on-off valve, whilst the jet control valve lever, mounted forward of the on-off valve and to one side, is operated with the tip of the thumb.

A further gun that can also be operated with one hand is provided with a single lever, located in the body of the handgrip and manoeuvred with the fingers, that shifts within a longitudinal vertical plane through a first angular position, producing operation of the on-off valve, and into a further sector that controls the jets; the other hand can be employed to position and tighten a pair of nuts on a longitudinally disposed threaded rod, so as to select and hold a given type of jet.

The gun first mentioned requires the use of both hands at all times, and thus keeps the operator fully occupied; the gun with the side-mounted lever cannot realistically be considered practical, at least when in use for any length of time, in view of the difficulty experienced in thumb-operation that derives from the considerable resistance set up by pressure of the controlled liquid; despite the advantage of its single-lever embodiment, the third gun mentioned still requires the use of the other hand to lock the lever in position, and the locking mechanism must be released to permit applying the on-off valve, which signifies loss of time, and again, the use of both hands, with all the attendant drawbacks.

Thus, the prior art stands in need of considerable improvement with regard to elimination of the aforementioned drawbacks, which in most instances are attributable to the fact that the control lever of a rotary control valve has to be swung between two limit positions -viz, a first position designed to produce a freely-discharging long jet of liquid, and a second designed to render the discharge as vortiginous as possible for producing a fine atomized spray; also, the provision of an an automatic locking facility on the main jet-adjustment settings would be desirable.

SUMMARY OF THE INVENTION

From the foregoing, the need will be discerned for a solution to the problem of embodying a gun, in particular for crop spraying with liquids, that is lightweight, low cost, and capable of being held and operated by one hand for any given length of time, in which the levers of the on-off and control valves remain independent notwithstanding they are operated by one hand, and remembering that in order to extract maximum ease-of-use employing one hand only, particularly for long durations, the finger operating the control valve must not be required to overcome undue hydraulic or mechanical resistances; moreover, the movement of which a user's finger is normally capable must be exploited sparingly, while obtaining the widest possible range of adjustment on the jet and ensuring a stable locking action at the preferred settings.

These objects are achieved in the gun disclosed by adoption of an on-off valve that is operated with the hindmost fingers of the hand, raising a lever recessed into the grip which locks into position, and, downstream of the on-off valve, a transversely and horizontally disposed rotary control valve with two passages, the axes of which lie in parallel longitudinal planes; the two passages consist in relative pairs of crossed holes that connect the upstream supply of liquid respectively with two downstream ducts formed in the barrel of the gun, one peripheral and creating a vortiginous flow, the other direct and discharging a long jet. The end of the barrel is fitted with an adjustable diffuser.

The jet control valve is designed to rotate in one direction only, indexed by way of a spring-loaded ratchet mechanism with mutually opposed parallel pawls.

The ratchet is operated by a longitudinally disposed central lever, the forward end of which formed into a clevis, and the rear end profiled advantageously to adapt to the forefinger, that can be pulled upwards beneath the recessed on-off lever to produce a number of stable angular positions comprising, at very least, the two respective limit positions which give the fine atomized spray and the long jet, and preferably, additional positions between the two limits that select intermediate spray patterns.

Advantages provided by the present invention are: elimination of the conventional sector type control valve movement, which is replaced by a perpetual indexed movement; the facility of selecting stable jet control valve positions independently of the operation of the on-off valve; the convenience of gripping the gun and depressing and setting the valve levers with one hand only; full exploitation of the operating possibilites of the control valve, using just one finger and without any appreciable effort; a generously wide range of jet and spray patterns; symmetry of the gun, enabling its use by left and right handed users with equal facility; ease of manufacture, with the main body of the gun fashioned in one piece, rather than the traditional two or more pieces; and compact dimensions obtained not least as a result of adopting the twin-parallel-pawl-ratchet mechanism arrangement to operate the control valve.

BRIEF DESCRIPTION OF THE DRAWINGS

A preferred embodiment of the invention will now be described in detail, by way of example, with the aid of the five accompanying sheets of drawings, in which:

FIG. 4 shows the grip from above in a view taken along the axis A of the on-off valve, which is angled marginally to the rear from the vertical;

FIG. 5 illustrates the rotary control valve in a vertical cross section taken through V—V in FIG. 2;

FIG. 6 illustrates the arrangement of the outlet passages from the control valve in a vertical section taken through VI—VI in FIG. 3;

FIG. 7 is a vertical cross section through VII—VII in FIG. 3, showing the air inlets of the diffuser fitted to the end of the barrel;

BEST MODE FOR CARRYING OUT THE INVENTION

Figure 1:
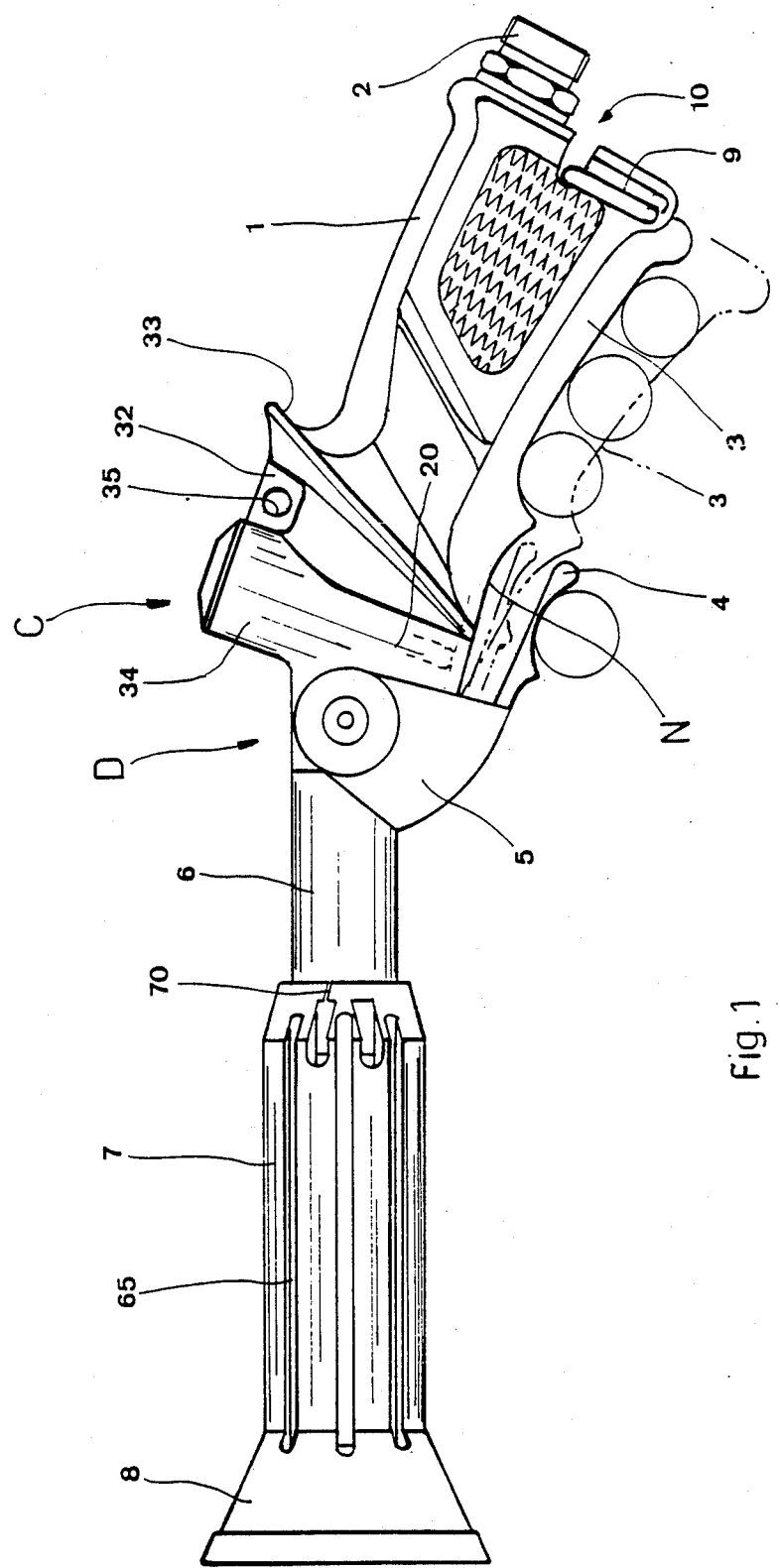
FIG. 1 is a side elevation of the gun, viewed with the on-off valve open and the control valve lever in the initial at-rest position, and illustrating the manner in which the fingers close around the grip; the thumb being not included.
Figure 2:
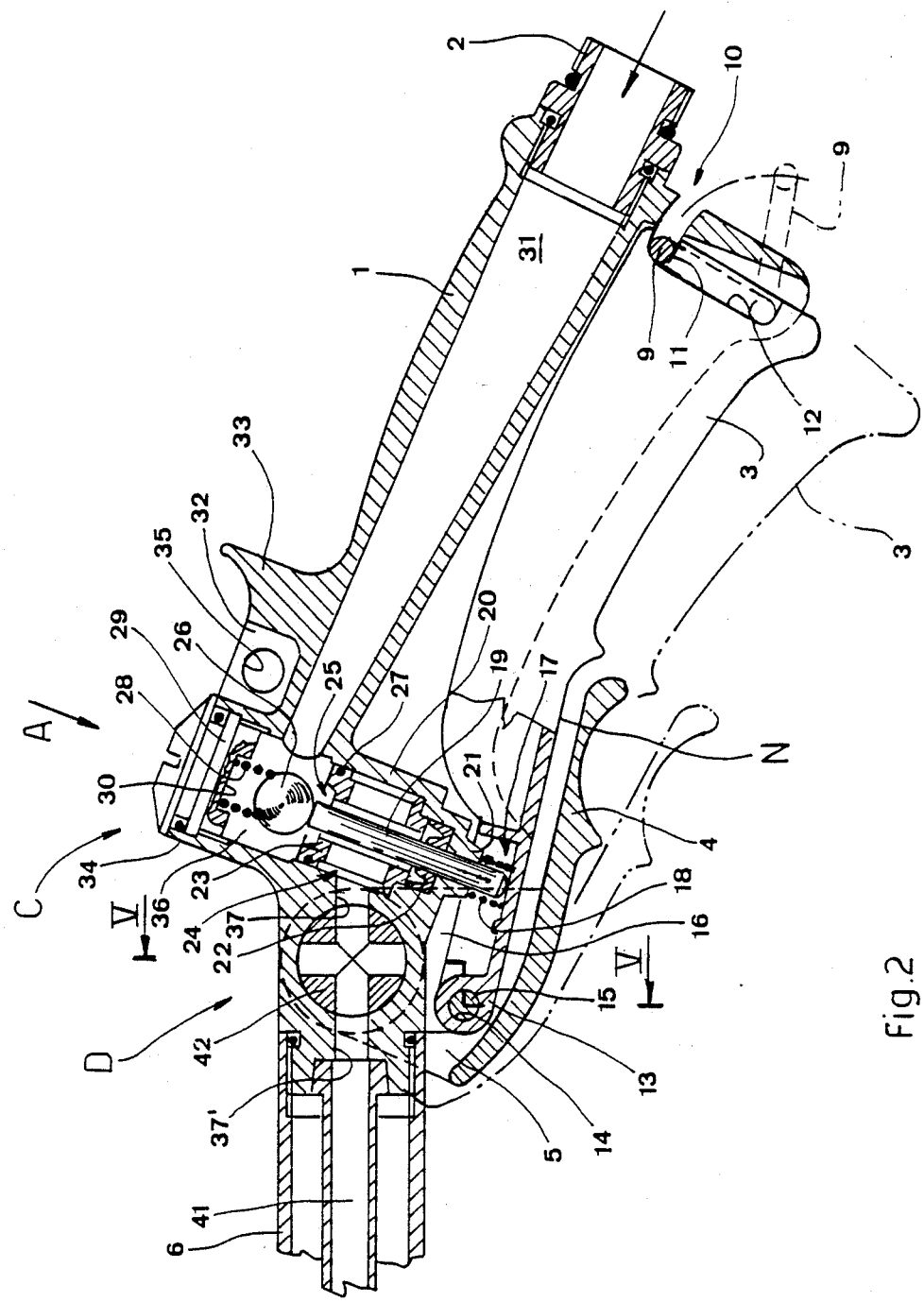
FIG. 2 is a longitudinal and vertical section taken through the grip, viewed on enlarged scale.

In the drawings, 1 denotes the anatomically moulded handgrip of the gun, which exhibits the shape of an upturned 'U' when viewed in section and is provided with a swivel fitting 2 at rear through which the supply of liquid enters under pressure.

3 denotes a lever of 'U' cross section accommodated by the downward facing cavity of the grip 1, which serves to operate an on-off valve located within a substantially central housing C, to the end of admitting or blocking the flow of liquid upstream of the control valve D.

4 denotes a ratchet lever fashioned with a downward facing arched profile, the forward end of which is embodied as a clevis 5 and associates with the rotary element of the control valve; the arched rear end of the lever 4 is accommodated in a recess N in the central part of the on-off valve lever 3, and thus is afforded a generous degree of travel.

6 denotes the barrel of the gun, the outlet end of which carries a coaxially disposed and axially adjustable diffuser 7 exhibiting a frusto-conical flare 8.

9 denotes a C-shaped catch hinged to the lower rear end of the grip 1, which serves both to limit the travel of the on-off valve lever 3 when in the OFF position, and to lock it into the ON position; the catch is accommodated by a recess 10 in the butt of the grip, which affords a slot 11 into which the C-shaped catch is made fast above the top rear surface of the lever 3 to lock the valve in the ON position; the rear end of the lever 3 affords a groove 12 at either side to accommodate the two inward-facing ends of the C-shaped catch 9, and thus permit of restraining the lever in the ON and OFF position.

13 denotes the forward end of the on-off lever 3, which afford a hole 14 for accommodation of a transverse pivot 15 supported by a pair of terminal lugs 16 extending down from the upturned-U members of the grip 1 at its forward end.

17 denotes the hollow top of the forward end of the on-off lever 3, which provides the seat for a coil spring 18 disposed with its axis angled marginally away from the vertical to the rear and coinciding with the axis of a plunger 19 impinging on the on-off valve element; more exactly, the sub-vertical axis of the spring and plunger lies with a median vertical and longitudinal plane, substantially at right angles to the hollow top 17 of the lever.

20 denotes a cylindrical bore formed internally of the grip 1 coaxial with the same sub-vertical axis, which forms a part of the on-off valve housing C. 21 denotes a hub at bottom of the bore, and 22 a seal seated therein, both of which accommodate the sliding movement of the plunger 19.

23 denotes a sleeve occupying the intermediate part of the cylindrical bore 20, aligned by way of its top and bottom ends and provided with peripheral openings 24 for passage of the liquid, which enters by way of a centrally located seat 25 afforded by the top end, in which the ball 26 of the on-off valve registers when lowered into the OFF position.

The fit between the top end of the sleeve 23 and the bore 20 is rendered fluid-tight by a seal 27.

28 denotes a spring against which the ball 26 is loaded, and 29 a cap enclosing the top end of the housing C, which also affords a cup 30 in which the top end of the spring 28 is seated.

31 denotes a longitudinal inlet formed in the top rounded part of the upturned-U cross section of the grip 1, through which the supply of liquid flows to the valves; 32, a longitudinal web connecting the hilt 33 of the grip with the uppermost boss 34 of the on-off valve bore 20; and 35, a hole formed in the web by which to suspend the gun from a hook, or whatever.

Figure 3:
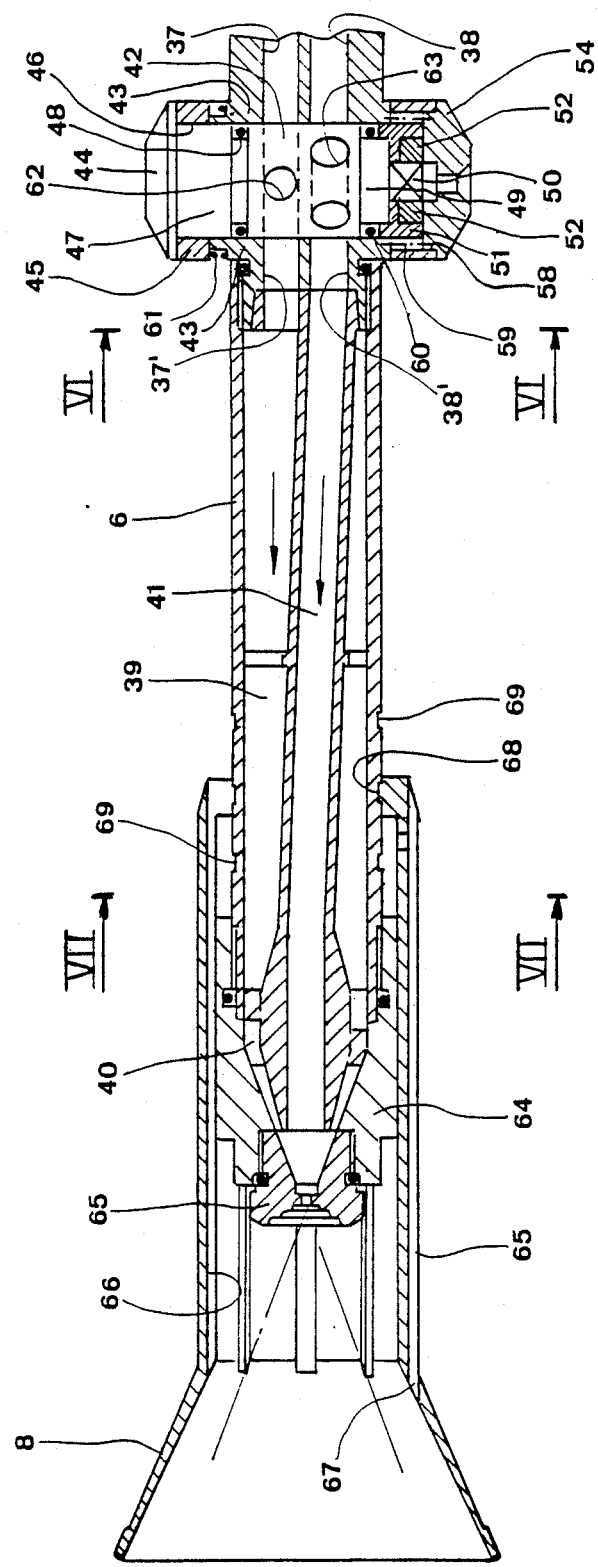
FIG. 3 is a longitudinal and horizontal section taken through the control valve and barrel, viewed on enlarged scale.
Figure 8:
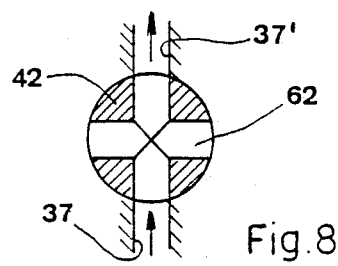
FIGS. 8 and 9 are schematic representations of the rotary control valve and the longitudinal passages, viewed in vertical cross section, which illustrate the limit position allowing full flow into the peripheral vortex-inducing duct and blocking flow to the long jet duct.
Figure 9:
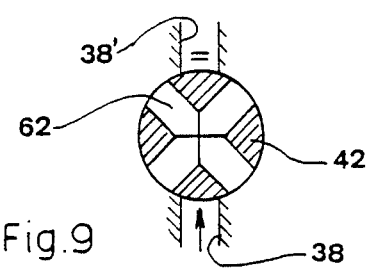
Figure 10:
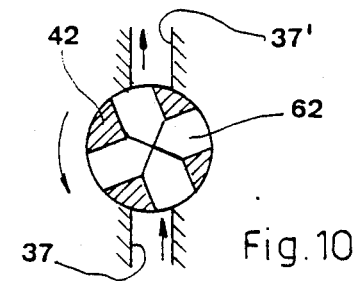
FIGS. 10 and 11 are sections similar to those of FIGS. 8 and 9, showing the valve rotated to the left through one quarter of a right angle so as to allow a substantially even division of the flow into both ducts of the barrel.
Figure 11:
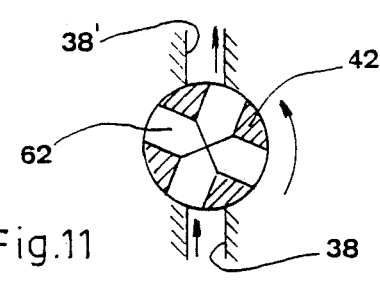
Figure 12:
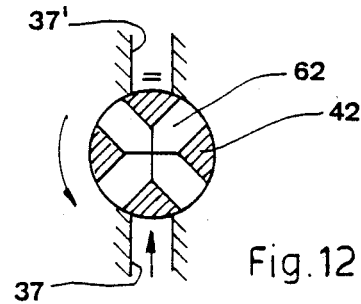
FIGS. 12 and 13 are sections similar to those of FIGS. 8 and 9, showing the valve rotated to the left through one half of a right angle so as to allow full flow into the long jet duct and block the vortex-inducing duct.
Figure 13:
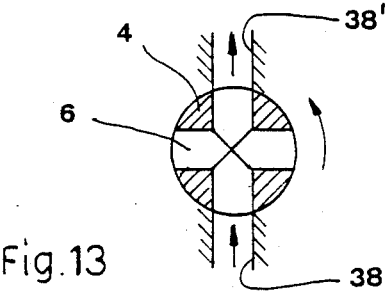

36 denotes the chamber occupied by the ball 26 of the on-off valve, by way of which the inlet 31 is connected with the seat 25 and the openings 24 in the sleeve 23, and thence to a pair of longitudinal inlet galleries 37 and 38 (see FIG. 3) communicating with the barrel 6. More exactly, the one gallery 37 connects with a peripheral duct 39 from which flow discharges by way of a vortex-inducing helical atomizer 40, the other gallery 38 with a central freely discharging duct 41, in both instances via the central section 42 of a rotary element forming part of the control valve D; the relative outlet galleries of the valve are denoted 37' and 38'.

43 denotes a horizontally and transversely disposed cylindrical bore located at the forward end of the grip, downstream of the on-off valve housing C and upstream of the barrel inlet, in which the rotary element of the control valve D is rotatably supported, held in position at one end by a head 44 breasted with the relative member 45 of the clevis 5 offered by the control lever 4; the clevis member affords a hole 46 into which the relative shank 47 of the element is freely inserted, and the fit between the shank and the bore 43 is ensured by a seal 48 seated in a groove that marks the relative boundary of the central section 42.

Figure 14:
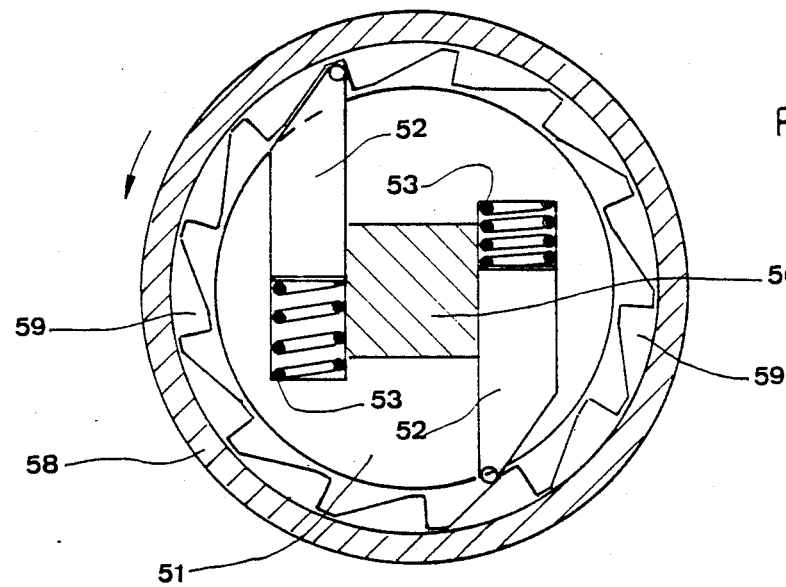
FIG. 14 is a vertical cross section through XIV—XIV in FIG. 5, showing the perpetual ratchet mechanism by which the rotary valve is operated.

43 denotes a shank at the end of the rotary element opposite from the head shank 47, which is smaller in diameter and extends axially into a prismatic key 50 engaged positively in a disk 51 constituting the pawl carrier of a ratchet mechanism mounted concentrically with the shank 49 and featuring a pair of parallel, mutually opposed sliding pawls 52 accommodated in corresponding frontal channels offered by the outer face of the disk and loaded against respective springs 53 (see FIG. 14).

54 denotes a cap fitted to the end of the valve element opposite from the head 44, which is aligned by way of a cylindrical spigot 55 extending from the key 50 and made fast by a screw 56 at centre.

57 denotes the member of the clevis 5 opposite to that denoted 45, which is embodied with a frontal outward facing socket 58 for receipt of the cap 54, and an internal sawtooth ratchet profile 59 that can be invested with movement by applying pressure to the lever 4 to the end of rotating the pawls 52, and with them, the rotary element of the valve D.

60 denotes a seal positioned between the smaller shank 49 and the pawl carrier 51, and 61 a torsion spring mounted with one end anchored to the bore 43 and the other end to the clevis member 45 remote from the ratchet, by which the lever 4 is returned to its at-rest position.

62 denotes a first pair of crossed holes located in the central section 42 of the valve element, the axes of which lie in the same vertical plane that contains those of the inlet and outlet galleries denoted 37 and 37'; similarly, 63 denotes a second pair of crossed holes in the rotary element, the axis of which lie in the same plane as those of the inlet and outlet galleries denoted 38 and 38'.

The two pairs of crossed holes 62 and 63 lie parallel and and are offset by 45° one in relation to the other.

64 and 65 respectively denote a threaded terminal, applied to the end of the barrel 6 and embodied internally with a frusto-conical profile to match the crests of the helical atomizer 40, and a nozzle screwed into the front end of the terminal.

The diffuser 7 is axially slidable in relation to the barrel 6 and terminal 64, and incorporates a plurality of peripheral, longitudinal flutes 66 formed in its internal surface that serve to channel air into the flare 8, the smaller base of which affords a corresponding plurality of peripheral holes 67 for the same purpose. The smaller diameter rear end of the diffuser exhibits a raised internal annular bead 68 designed to snap into one of a set of circumferential grooves 69 let into the barrel 6, thereby enabling adjustment of the longitudinal position of the diffuser, according to the size of nozzle fitted, to obtain maximum atomization of the spray; the snap fit is favored by inclusion of a set of longitudinal slots 70 in the rear end of the diffuser, which enhance deformability.

Operation of the gun will now be described.

Laying hold on the grip 1 with one hand, the three hindmost fingers squeeze the on-off lever 3, which is thus drawn up into the upturned-U recess against the action of the spring 18 ensheating the bottom end of the plunger 19, such that the plunger itself is also lifted, unseating the ball 26 from its seat 25 and causing the chamber 36 of the housing C to connect with the inlet galleries 37 and 38 of the rotary control valve D; at this point, the lever 3 can be locked in position by locating the catch 9 as in FIG. 1.

The forefinger of the same hand is now used to draw the lever 4 of the control valve up and into the recess N of the on-off lever, as a result of which the pawl carrier disk 51 is rotated through a given angle by the relative member 57 of the clevis 5, and the central section 42 of the valve element thus indexed through an angle corresponding to one or more teeth of the ratchet 59, or to a fraction of one tooth.

Depending on the width on the angle accomplished, a given rotation of the valve element, produced by single or repeated trips of the ratchet effected with the lever 4, will produce the following stable settings:

flows directed entirely into the peripheral duct 39 serving the atomizer 40;

flow directed entirely into central duct 41 to give a freely discharged long jet;

flow directed into both ducts and proportioned respectively by appropriate use of the lever 4.

In addition, a significantly wide range of spray and jet patterns can be obtained with the gun according to the invention.

The foregoing specification implies no limitation; for example, notwithstanding its obvious advantages of compactness, simplicity and mechanical strength, the preferred twin-pawl embodiment of the ratchet mechanism might equally well be replaced with a different, albeit less advantageous alternative; again, the ratchet mechanism might be discarded altogether, likewise less advantageously, in favor of any other given unidirectional angular drive.

What is claimed is:

1. A gun, for crop spraying in particular, comprising a hollow handgrip, a housing including normally-closed sub-vertical spring-loaded ball type on-off valve operated by a lever recessed into the hollow grip, a horizontal rotary control valve with a cylindrical element affording transverse passages that connect an inlet in the grip with two outlet ducts formed in a barrel, one peripheral and incorporating an atomizing means, the other central and discharging freely by way of chamber, said rotary control valve located uppermost in the on-off valve housing and a sleeve with radial openings located beneath a seat of the on-off valve ball, and a diffuser fitted to a downstream end of the barrel; wherein the rotary valve element is operated by a relative lever and a butt of the grip affords means of retaining the recessed on-off lever in a stable position, characterized in that the rotary element of the control valve comprises a central section with two sets of holes arranged in crossed formation, said two sets offset through 45° in relation to one another and disposed with their relative axes lying in two parallel vertical and longitudinal planes, of which the one set connects a longitudinal inlet gallery at a side downstream from the on-off valve with a corresponding longitudinal outlet gallery serving the peripheral duct and the atomizing means, and the remaining set connects a longitudinal gallery at the on-off valve side with a corresponding longitudinal outlet gallery serving the freely discharging central duct; and in that the element of the control valve is perpetually rotatable and driven by lever-operated means for generating unidirectional angular movement against the action of a torsion spring.

2. A gun as in claim 1, wherein means for generating unidirectional angular movement includes a ratchet mechanism, comprising:

said relative lever, occupying a median longitudinal plane and connected with a clevis at its forward end, by means of two members affording respective holes one of which freely accommodates a larger diameter shank located adjacent to a head exhibited by one end of the rotary valve element;

an internal saw-tooth ratchet profile offered by the remaining hole of the clevis;

a disk, keyed to a prismatic part of the valve element at the end of the central section and sets of crossed holes opposite to the end exhibiting the head, the outward-facing surface of which affords two frontal channels disposed parallel and in mutually opposed positions either side of centre, each slidably accommodating a respective pawl urged against the teeth of the ratchet by a relative spring;

a cap enclosing the ratchet mechanism of the rotary control valve at the end opposite from the head;

said torsion spring, having one end anchored to a member of the clevis, the other to said on-off valve housing.

3. A gun as in claim 1, wherein the lever that operates the rotary control valve exhibits a downward-facing arched profile, and when raised to its upper travel limit, is accommodated by a central concave part of the on-off valve lever.

* * * * *